INVENTOR.
LEONARD M. CARREIRA

United States Patent Office 3,561,864
Patented Feb. 9, 1971

3,561,864
ELECTROPHORETIC COATING DEVICE
Leonard M. Carreira, Webster, N.Y., assignor to Xerox Corporation, Rochester, N.Y., a corporation of New York
Filed Oct. 2, 1968, Ser. No. 764,478
Int. Cl. G03g 15/00
U.S. Cl. 355—3
4 Claims

ABSTRACT OF THE DISCLOSURE

An electrophoretic imaging process is disclosed utilizing a continuous coating device. The imaging process uses at least one roller electrode and the coating device includes two coating members positioned in contact with the surface of the roller electrode. As the roller rotates a photoelectrophoretic imaging suspension is metered onto its surface by one of the coating members.

BACKGROUND OF THE INVENTION

This invention is related to an imaging system and more specifically to an improved electrophoretic imaging system.

In photoelectrophoretic imaging, colored photosensitive particles are suspended in an insulating carrier liquid. This suspension is placed between at least two electrodes, subjected to a potential difference and exposed to an image to be reproduced. Ordinarily, in carrying out the process, the imaging suspension is placed on a transparent electrically conductive plate in the form of a thin film and exposure is made through the transparent plate while a second generally cylindrically shaped biased electrode is rolled across the top of the suspension. The particles are believed to bear an initial charge when they are suspended in the liquid carrier which causes them to be attracted to the transparent base electrode and upon exposure, to change polarities by exchanging charge with the base electrode such that the exposed particles migrate away from the base electrode to the second or roller electrode thereby forming images on both of the electrodes by particle subtraction, each image being complementary to the other. The process may be used to produce both polychromatic and monochromatic images. In the latter instance a single color photo-responsive particle may be used in the suspension or a number of differently photoresponsive particles may be used all of which respond to the same wavelength of light exposure. An extensive and detailed description of the photoelectrophoretic imaging technique as described above may be found in U.S. Pat. Nos. 3,383,993, 3,384,488, 3,384,565 and 3,384,566.

In the case of the polychromatic imaging process the imaging suspension will contain a plurality of at least two differently colored finely divided particles in a carrier liquid, each of said particles comprising an electrically photosensitive pigment whose principal light absorption band substantially coincides with its principal photosensitive response. Thus, the pigment represents both the primary electrically photosensitive ingredient and the primary colorant for the specific particle in suspension. The particles in the polychromatic system should preferably have intense pure colors and be highly photosensitive. It is preferred that the particles migrate with minimum exposure to activating electromagnetic radiation, and that particles of each color migrate to an equal extent upon equal exposure to light of the complementary color. Where the particle mix is exposed to a multicolored image, particles will migrate to one electrode in proportion to the intensity of the light which they absorb. This migration should take place with a minimum of electrical interaction between particles of different colors. Thus it is preferred and desired that particles selectively remain on one of the electrodes in image configuration with unwanted particles migrating to the other electrode in the system. For example, when a mixture comprising cyan, magenta and yellow particles is exposed to an image by yellow light, the cyan and magenta particles should migrate leaving behind an image made up of yellow particles. Similarly, when exposed to a multicolored image, different colored particles absorb light of their complementary color in appropriate image areas and migrate leaving a full colored image corresponding to the original.

Prior to imaging, the particle suspension must be coated to a fairly exact thickness on at least one of the electrodes in the imaging system. When done in the laboratory the coating may be applied manually by pouring a small amount of the imaging suspension onto the respective electrode and spreading the suspension in a manner so as to produce as nearly as possible a uniform thickness of the suspension. In an automatic, commercially useable system coating by manual methods is neither practical nor acceptable. Thus, it is necessary to provide a means for applying the imaging suspension to the respective electrode in a manner which lends itself to a continuous, automatic imaging system such that will provide uniform coatings of the imaging suspension at a consistent thickness.

SUMMARY OF THE INVENTION

It is, therefore, an object of this invention to provide an imaging system which will overcome the above-noted disadvantages.

It is a further object of this invention to provide a novel continuous electrophoretic imaging system utilizing a controlled coating mechanism.

Still, a further object of this invention is to provide a novel photoelectrophoretic imaging apparatus.

Yet, still a further object of this invention is to provide a means whereby the imaging suspension utilized in the system may be uniformly and continuously applied.

Another object of this invention is to provide a method whereby the imaging suspension under exposure is maintained at a consistent concentration.

The foregoing objects and others are accomplished in accordance with the present invention, generally speaking, by providing an imaging apparatus consisting of an electrode system utilized in conjunction with an imaging suspension comprising a plurality of light absorbing photoelectrophoretic imaging particles in an insulating liquid carrier. The imaging apparatus utilizes at least one electrode in roller configuration and at least one additional electrode, at least one of the electrodes being partially transparent. Rotatably mounted in close proximity to the roller electrode is a coating means which continuously applies the imaging suspension to the surface of the roller electrode and following imaging recoats the same surface thereby eliminating the need for cleaning the roller electrode surface between successive imaging cycles. The imaging suspension coated on the surface of the imaging roller is exposed selectively to an electromagnetic radiation source through the transparent electrode while simultaneously applying voltage across the imaging suspension. As a result of the particle migration within the system images are formed on the surface of the transparent electrode with the color particles complementary to those of the image which is formed on the transparent electrode migrating to the surface of the roller electrode. The roller or imaging electrode is recoated by the above-mentioned coating device so as to replenish the imaging suspension to the desired compositional makeup while maintaining a coating thickness which provides the highest quality images.

It has been determined that by placing a automatic coating device in close proximity to the surface of the imaging roller of the apparatus utilized to carry out the process herein described, it is now possible to uniformly coat the surface of the imaging roller, while substantially simultaneously maintaining a uniform concentration of the imaging suspension in a manner which eliminates the need for cleaning the beforesaid roller between imaging cycles while providing an expedient and reliable system.

BRIEF DESCRIPTION OF DRAWINGS

The invention is illustrated in the accompanying drawings wherein.

DETAILED DESCRIPTION

Figure 1:
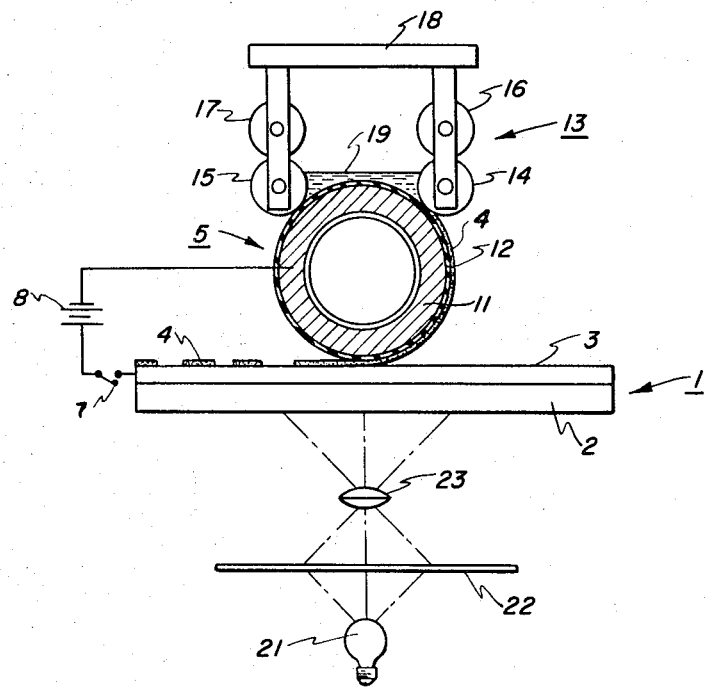
FIG. 1 represents a side sectional view of a simple exemplary system for carrying out the steps of the present invention.

Referring now to FIG. 1 there is a transparent electrode generally designated 1 which, in this exemplary instance, is made up of a layer of optically transparent glass 2 overcoated with a thin transparent layer 3 of tin oxide. The latter configuration is commercially available under the trade name NESA glass. This electrode will hereinafter be referred to as the injecting electrode. In close proximity to the injecting electrode 1 is a rotary electrode 5 having a conductive central core 11 which is covered with a layer of blocking electrode material 12. Although a blocking electrode material need not necessarily be used in the system, the use of such a layer is preferred because of the markedly improved results which it is capable of producing. The latter electrode is referred to as the blocking or imaging electrode. A detailed description of the improved results and the types of materials which may be employed as the electrode coating material is described in detail in U.S. Pat. 3,383,993. A thin layer 4 of the imaging suspension of the present invention which consists of finely divided photosensitive particles dispersed in an insulating carrier liquid is coated on the surface of the blocking electrode by coating means generally designated 13 which both meters the application of the imaging suspension so that it is applied to a uniform thickness and keeps the concentration of the composition constant. The coating means comprises coating rods 14 and 15 with pressure rollers 16 and 17. The coating pressure rods are suspended by support 18. The ink reservoir 19 inherently develops on the upper surface of the blocking electrode 5. During this initial part of the description of the invention the term "photosensitive" may be thought of as any particle which, once attracted to the injecting electrode will migrate away from it under the influence of an applied electric field when it is exposed to actinic electromagnetic radiation. The imaging suspension may also contain a sensitizer and/or binder for the pigment particles which is at least partially soluble in the suspending or carrier liquid. As the blocking or imaging roller 5 is passed across the surface of the injecting electrode 1, switch 7 is closed which, as a result of the presence of power source 8, establishes an electric field across the imaging suspension 4. The pigment suspension is exposed by way of a projection mechanism made up of light source 21, transparency 22 and lens system 23. For purposes of this illustration a positive color transparency is utilized during the process. As the imaging roller passes across the surface of the NESA electrode ink from the reservoir 19 is applied consistently and in a uniform manner to the surface of the imaging electrode. The light exposure causes the exposed particles originally attracted to the injecting electrode 1 to migrate through the liquid carrier and adhere to the surface of the imaging electrode 5 leaving behind an image on the surface of the injecting electrode which is a duplicate of the original transparency 22.

Figure 2:
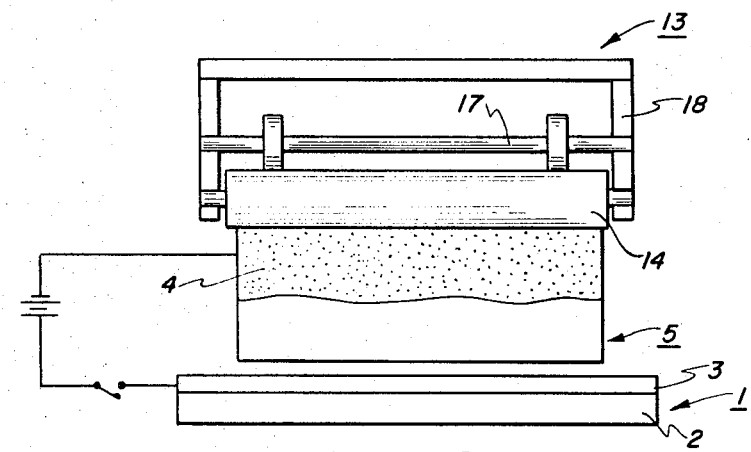
FIG. 2 shows a frontal view of the roller electrode coating means of the present invention.

Referring now to FIG. 2 there is seen in a frontal view of the imaging apparatus of FIG. 1. The coating means 13 comprising the support 18, coating rod 14, and pressure rod 17, applies the imaging suspension 4 to the surface of the blocking electrode 5. The injecting electrode 1 comprising the conductive substrate 2 and tin oxide coating 3 is situated beneath the blocking electrode 5. The imaging suspension is in turn exposed to an original by way of the NESA electrode.

Figure 3:
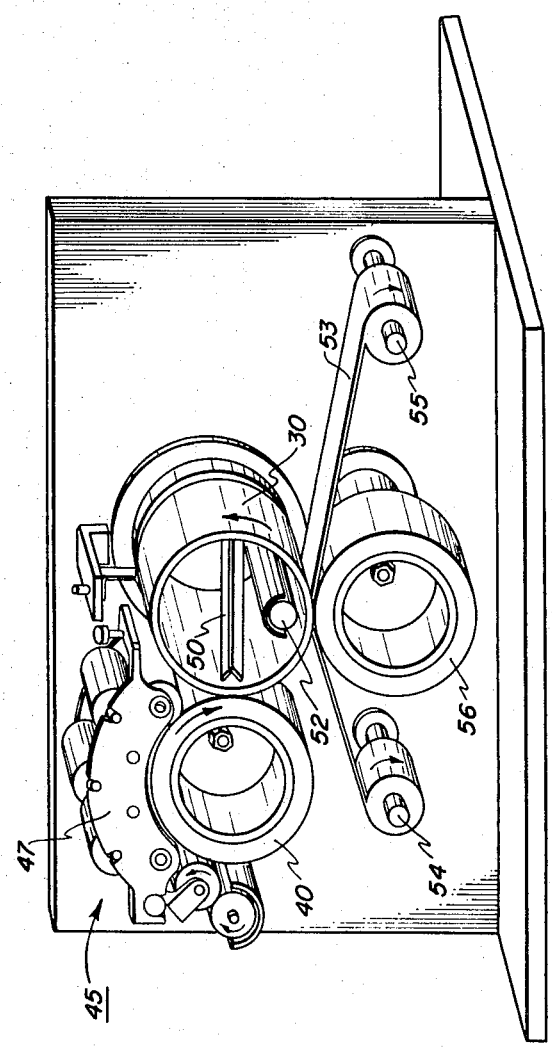
FIG. 3 represents a perspective view of an alternate embodiment of the present invention.

In FIG. 3 there is seen a perspective view of a continuous duplicator utilizing the coating mechanism of the present invention. There is seen a rotary transparent electrode 30 which is referred to above as the injecting electrode. In close proximity to the transparent electrode and having its axis parallel to that of the transparent electrode is a rotary imaging electrode 40. Above the imaging electrode is located the coating means of the present invention. The coating means 45 is represented as a multitude of rollers strategically placed and numbered so as to evenly distribute and meter the imaging suspension in its application to the surface of the imaging electrode. The coating rollers are illustrated within a housing mechanism 47. Within the transparent electrode there is situated an image inverting roof mirror 50 which relays the image which is transmitted along the axis of the injecting electrode and directs the reflected image onto the surface of the imaging suspension at the area of contact between the injecting electrode and the imaging electrode. Also situated within the injecting electrode is a means 52 for transferring the image formed on the surface of the injecting electrode to the surface of the paper copy sheet 53 which is provided by way of paper supply roll 54 and preserved after image transfer by way of paper rewind roll 55. Contact roller 56 serves to deliver the paper copy sheet to the surface of the injecting electrode at the point of image transfer. The image transfer step may be performed electrophoretically as in the present illustration or the image may be transferred by other suitable means such as by adhesive pickoff of the image from the surface of the injecting electrode onto the surface of the copy web. Thus, the copy web may consist of an adhesive-like material which will pick up the image as it passes over the roller 56.

When used in the course of the present invention the term injecting electrode should be understood to mean that it is an electrode which will preferably be capable of exchanging charge with the photosensitive particles of the imaging suspension when the suspension is exposed to light so as to allow for a net change in the charge polarity of the particles. By the term blocking electrode is meant one which is capable of injecting electrons into or receiving electrons from the above mentioned photosensitive particles at a negligible rate when the particles come into contact with the surface of the electrode.

It is preferred that the injecting electrode be composed of an optically transparent material such as glass overcoated with a conductive material such as tin oxide, copper, copper iodide, gold, or the like in order to obtain optimum results; however, other suitable materials including many semiconductive materials such as raw cellophane, which are ordinarily not thought of as conductors but which are still capable of accepting injected charge carriers of the proper polarity under the influence of the applied field, may be used within the course of the present invention. The use of more conductive materials allows for cleaner charge separation and prevents possible charge buildup on the electrode which tends to diminish the the interior electrode field. The blocking electrode, on the other hand, is selected so as to prevent or greatly retard the injecting of electrons into the photosensitive pigment particles when the particles reach the surface of this electrode. The blocking electrode base generally will consist of a material which is fairly high in electrical conductivity. Typical conductor materials are conductive rubber and metal foils of steel, aluminum, copper and brass. Preferably the core of the blocking electrode will have a high electrical conductivity. However, if a low conductivity material is used, a separate electrical connection may be made to the back of the blocking layer of the electrode. Although a blocking electrode material may not necessarily be used in the system, the use of such a layer is preferred because of the markedly improved results which it is capable of producing. It is preferred that the blocking layer when used be either an insulator or a semiconductor which will not allow for the passage of sufficient charge carriers under the influence of an applied field to discharge the particles loosely held to its surface thereby preventing particle oscillation within the system. Although the blocking electrode does allow for the passage of some charge carriers it would still be considered to come within the class of preferred materials if it does not allow for the passage of sufficient carrier to recharge the particles to the opposite polarity. Exemplary of the preferred blocking layer materials used are baryta paper which consists of paper coated with barium sulfate suspended in a gelatin solution, Tedlar, a polyvinyl fluoride commercially available from E. I. du Pont de Nemours & Co., Inc. and polyurethane. Any other suitable materials having a resistivity of about $10^7$ ohm-cm. or greater may be employed as the blocking electrode material. Typical materials in this resistivity range include cellulose acetate coated papers, polystyrene, polytetrafluoroethylene and polyethylene terephthalate. The baryta paper, Tedlar, and the other materials used as the blocking layer may be wetted on the back surface with tap water or coated with electrically conductive materials. The blocking electrode layer, when utilized, may be a separate replaceable layer which is either taped to the blocking electrode or held by mechanical fasteners or any other device which is capable of simply holding the layer on the electrode. In the alternative, the layer may be an integral part of the electrode itself, being either adhesively bonded, laminated, spray coated or otherwise applied to the surface of the electrode.

Any suitable insulating carrier liquid may be used in the course of the present invention. Typical materials found suitable include decane, dodecane, and tetradecane, molten paraffin wax, molten beeswax, and other molten thermoplastic materials, Sohio Odorless Solvent, a kerosene fraction commercially available from Standard Oil Co. of Ohio, and Isopar G, a long chain saturated aliphatic hydrocarbon commercially available from Humble Oil Co. of New Jersey and mixtures thereof.

A wide range of voltages may be applied between the electrodes in the system. For good image resolution, high image density and low background it is preferred that the potential be such as to create an electric field of about 300 volts per unit across the imaging suspension. The applied potential necessary to attain the field of strength will, of course, vary depending upon the inter-electrode gap and upon the thickness and type of blocking material used on the blocking electrode surface. Voltages as high as 5000 volts have been employed to produce images of high quality. The upper limit of the field strength is limited only by the breakdown potential of the suspension and blocking material.

In the polychromatic system, the particles are selected so that those of different colors respond to different wavelengths in the visible spectrum corresponding to their principal absorption and further so that their spectral response curves do not have substantial overlap, thus allowing for color separation and subtractive multicolor image formation. Several different particles are employed namely a cyan colored particle sensitive mainly to red light, a magenta colored particle sensitive mainly to blue light. While this is the simplest combination, additional particles having different absorption maxima may be added to improve color synthesis. When mixed together in the carrier liquid, these particles produced a generally black liquid and when one or more of the particles are caused to migrate from the injecting electrode towards the blocking electrode they leave behind particles which produce a color equivalent to the color of the impinging light source. Thus, for example, red light exposure causes the cyan colored pigment to migrate thereby leaving behind the magenta and yellow pigments which combine to produce red in the final image. In the same manner, blue and green color light is reproduced by removal of yellow and magenta pigment respectively and, of course, when white light impinges upon the mix all pigments migrate leaving behind the color of the white or transparent substrate. A dark exposure leaves behind all pigments which combine to produce a black image. It should be recognized that this is an ideal technique of subtractive color imaging in that the particles are not only each composed of but one component but in addition they perform a dual function in that they act both as the final image colorant and the photosensitive medium of the system. Accordingly, the system represents virtually the ultimate in eliminating the complexity of prior art methods of subtractive color imaging.

It is desirable to use pigment particles which are relatively small in size because smaller particles produce better and more stable pigment dispersions in the liquid carrier and in addition are capable of producing images of greater coloring power and higher resolution than would be possible with particles of larger sizes. Even where the pigments are not commercially available in small particle sizes the particle size may be reduced by conventional techniques such as ball milling or the like. When the particles are suspended in the liquid carrier they may take on a net electrostatic charge so that they may be attracted towards one of the electrodes in the system depending on the polarity of the charge with respect to that of the electrodes. It is not necessary that the particles take on only one polarity of charge but instead the particle may be attracted to both electrodes. Some of the particles in the suspension initially move towards the injecting electrode while others move towards the blocking electrode with this type of system; however, this particle migration takes place uniformly over the entire area covered by the two electrodes and the effect of imagewise, exposure-induced migration is superimposed upon it. Thus, the apparent bipolarity of these suspensions in no way affects the imaging capability of the system except for the fact that it subtracts some of the particles uniformly from the system before imagewise modulation of the particle migration takes place. In other words, the above behavior causes a portion of the suspended particles to be removed from the system as potential image formers. The effect of subtraction of some of these particles as potential image formers in the system is easily overcome by merely forming an initial suspension of particles contained in a sufficiently high particle concentration such that the system is still capable of producing intense images. Also, it has been found that with some suspensions of this type, either polarity of potential may be applied to the electrodes during imaging.

Any suitable different colored photosensitive pigment particles having the desired spectral responses such as disclosed in U.S. Pat. 3,384,488 may be used to form the imaging suspension of the present invention. The photosensitive pigment may, for example, be polymeric in nature. The percentage of pigment in the insulating liquid carrier is not considered critical; however, for reference purposes, it is noted that from about 2 to about 10 percent pigment by weight has been found to produce desirable and acceptable results.

As previously stated, once the particle image is formed it may be fixed to the respective electrode such as by spraying a binder onto the surface, by laminating an overlay over the imaged surface or by including a binder in the liquid suspension medium. Generally, it will be found preferable to transfer the image from the electrode and fix it on a secondary surface so that the electrode may be reused. Such a transfer step may be carried out by an adhesive pickoff technique such as with adhesive tape or preferably by electrostatic field transfer. Transfer may also be effected by electrophoretic means such as is illustrated in FIG. 3.

The coating device of the present invention may comprise at least more than one roller to disperse the suspension on the imaging or blocking electrode. However, the number of rollers utilized in conjunction with the imaging apparatus will be determined by the particular application of the imaging system with respect to the degree of thickness the suspension is to be coated on the imaging electrode. Representative coating thicknesses range from about 1 to about 6 mils with a coating thickness of about 4 mils generally preferred. Any suitable coating rod may be used such as a glass coating rod, a wire wound metal coating rod, nylon thread on a glass rod, a properly situated doctor blade configuration or rubber rollers. The wire wound or Mayer rod is presently the most widely used. Although various electrode spacings may be employed, spacings of less than about 1 mil and extending down to where the electrodes are substantially being pressed together, are preferred.

To further define the specifics of the present invention the following examples are intended to illustrate and not limit the subject matter of the present invention. Parts and percentages are by weight unless otherwise indicated.

PREFERRED EMBODIMENTS

In the following examples, four different imaging suspension are employed utilizing the apparatus of the general type illustrated in FIG. 1. The injecting electrode is made up of NESA glass and the surface of the glass is connected to ground. The blocking electrode consists of a hard conductive rubber core of approximately 2 inches in diameter coated with a layer of waterproof baryta paper. A negative voltage of 2500 volts is applied across the imaging suspension during exposure. Exposure is made with a 3200° K. lamp through a photographic transparency with a light intensity of about 1800 foot-candles. The imaging suspension used in these examples consists of about 7 parts by weight of photosensitive particles in mineral oil. A wire-wound metal rod is used as the coating rod in Examples I and II and a rubber roller is used in Examples III and IV. The imaging suspension is coated on the surface of the blocking electrode to a thickness of about 3 mils for Examples I and II and 4 mils for Examples III and IV.

Example I

A tri-mix is prepared dispersing equal parts of a cyan pigment, Monolite Fast Blue G.S., the alpha form of metal-free phthalocyanine, C.I. No. 74100, available from Arnold Hoffman Co.; a magenta pigment, Watchung Red B, a barium salt of 1-(4'-methyl-5'-chloro-2'-sulfonic acid)azobenzene-2-hydroxy-3-naphthoic acid, C.I. No. 15865, available from E. I. du Pont de Nemours & Co., and a yellow pigment, Algol Yellow, G.C., 1,2,5,6-di-(C,C'-diphenyl)thiazole anthraquinone, C.I. No. 67300, available from General Dyestuffs, in mineral oil. The tri-mix is coated and images as described above forming a full colored image conforming to the original transparency.

Example II

A tri-mix is prepared by dispersing equal parts of a cyan pigment, Diane Blue, 3,3'-methoxy-4,4'-diphenyl-bis(1''-azo-2''-hydroxy-3''-naphthanilide), C.I. No. 21180, available from Harmon Colors; a magenta pigment, Calcium Lithol Red, a calcium lake of 1-(2'-azonaphthalene-1'-sulfonic acid)-2-napthol, C.I. No. 15630, available from Collway Colors; and a proprietary yellow pigment, N-2''-pyridyl-8,13-dioxodinaphtho-(2,1-6; 2',3'-d)-furan-6-carboxamide, disclosed in U.S. patent application No. 421,281, now Pat. No. 3,447,922, filed Dec. 28, 1964, and having a common assignee, in mineral oil. The tri-mix is imaged as described above forming a full colored image conforming to the color transparency.

Example III

Seven parts by weight of the metal-free phthalocyanine pigment disclosed in Example I is blended with mineral oil. The resulting tri-mix is coated on a NESA electrode and imaged as described above. A single color cyan image on a background of white is formed.

Example IV

An imaging suspension comprising equal amounts of Bonadur Red B, 1-(4'-chloro-5'-ethyl-2'-sulfonic acid) azobenzene-2-hydroxy-3-napthoic acid, available from American Cyanamide; Monolite Fast Blue G.S., and the proprietary yellow pigment disclosed in Example I in Sohio Solvent 3440 is prepared and imaged as described above. A full colored image conforming to the original color transparency is obtained.

Although the present examples were specific in terms of conditions and materials used, any of the above listed typical materials may be substituted when suitable in the above examples with similar results being obtained. In addition to the steps used to carry out the process of the present invention, other steps or modifications may be used, if desirable. Other materials may also be incorporated in the imaging suspension and other facets of the invention which will enhance, synergize or otherwise desirably effect the properties therein desired. For example, various sensitizers may be utilized in conjunction with the imaging suspension.

Anyone skilled in the art will have other modifications occur to them based on the teachings of the present invention. These modifications are intended to be encompassed within the scope of this invention.

What is claimed is:

1. Photoelectrophoretic imaging apparatus comprising
    a roller electrode spaced up to about one mil from a second electrode defining a closely spaced interface, at least one of said electrodes being transparent and one being an injecting electrode and the other a blocking electrode,
    means for rotating said roller electrode and for moving one electrode over an area on the other,
    means for coupling said electrode to an electrical source for establishing an electrical field across the closely spaced interface between them,
    means for directing actinic electromagnetic radiation to the closely spaced interface between the electrodes, and
    at least two coating members positioned in contact with the surface of the roller electrode to form a reservoir over a surface of the roller electrode for storing photoelectrophoretic imaging suspension with one of said members capable of metering a substantially uniform layer of suspension onto the surface of a rotating roller electrode as it exits the reservoir,
    whereby images are formed on said electrodes from imaging suspension metered onto said roller electrode and exposed to electric field and imagewise electromagnetic radiation at said closely spaced interface.

2. The apparatus of claim 1 wherein said coating members include coating rods journaled for rotation in a support with their peripheries in contact with the surface of the roller electrode.

3. The apparatus of claim 2 wherein at least one of said rods is a rubber roller.

4. The apparatus of claim 2 wherein at least one of said rods is a wire wound roller.

References Cited

UNITED STATES PATENTS

| | | | |
|---|---|---|---|
| 2,066,780 | 1/1937 | Holt | 118—414X |
| 3,043,684 | 7/1962 | Mayer | 355—17X |
| 3,270,637 | 9/1966 | Clark | 355—10X |
| 3,383,993 | 5/1968 | Yeh | 355—3 |
| 3,446,722 | 5/1969 | Stein et al. | 96—1.4X |

JOHN M. HORAN, Primary Examiner

K. C. HUTCHISON, Assistant Examiner

U.S. Cl. X.R.

355—4